US 12,172,319 B2

(12) United States Patent
Cantor et al.

(10) Patent No.: US 12,172,319 B2
(45) Date of Patent: Dec. 24, 2024

(54) SYSTEMS AND METHODS FOR PROCESS TENDING WITH A ROBOT ARM

(71) Applicant: Clearpath Robotics Inc., Kitchener (CA)

(72) Inventors: Daniel Cantor, Kitchener (CA); Ryan Christopher Gariepy, Kitchener (CA); Roydyn Clayton, Kitchener (CA); Yvan Geoffrey Rodrigues, Kitchener (CA); Anthony William Tod, Kitchener (CA); Bryce William Vondervoort, Kitchener (CA)

(73) Assignee: ROCKWELL AUTOMATION TECHNOLOGIES, INC., Mayfield Heights, OH (US)

( * ) Notice: Subject to any disclaimer, the term of this patent is extended or adjusted under 35 U.S.C. 154(b) by 0 days.

(21) Appl. No.: 18/534,005

(22) Filed: Dec. 8, 2023

(65) Prior Publication Data
US 2024/0149451 A1 May 9, 2024

Related U.S. Application Data

(63) Continuation of application No. 17/979,597, filed on Nov. 2, 2022, now Pat. No. 11,872,706, which is a
(Continued)

(51) Int. Cl.
*B25J 9/16* (2006.01)
*B25J 5/00* (2006.01)
(Continued)

(52) U.S. Cl.
CPC ............. *B25J 9/1666* (2013.01); *B25J 5/007* (2013.01); *G05B 15/02* (2013.01);
(Continued)

(58) Field of Classification Search
None
See application file for complete search history.

(56) References Cited

U.S. PATENT DOCUMENTS

| 5,023,790 A | 6/1991 | Luke, Jr. |
| 6,315,513 B1 | 11/2001 | Harukawa et al. |

(Continued)

FOREIGN PATENT DOCUMENTS

| CN | 101625573 A | * | 1/2010 | ............... G05D 1/02 |
| CN | 205058045 U | * | 3/2016 | ............... B25J 9/16 |

(Continued)

OTHER PUBLICATIONS

Xu et al., "Shared control of a robotic arm using non-invasive brain-computer interface and computer vision guidance", Jul. 2018, Robotics and Autonomous Systems 115 (2019) 121-129. (Year: 2018).*

(Continued)

*Primary Examiner* — Mohammad Ali
*Assistant Examiner* — Kelvin Booker

(57) ABSTRACT

Systems and methods for process tending with a robot arm are presented. The system comprises a robot arm and robot arm control system mounted on a self-driving vehicle, and a server in communication with the vehicle and/or robot arm control system. The vehicle has a vehicle control system for storing a map and receiving a waypoint based on a process location provided by the server. The robot arm control system stores at programs that is executable by the robot arm. The vehicle control system autonomously navigates the vehicle to the waypoint based on the map, and the robot arm control system selects a target program from the stored programs based on the process location and/or a process identifier.

14 Claims, 7 Drawing Sheets

Related U.S. Application Data continuation of application No. 16/561,519, filed on Sep. 5, 2019, now Pat. No. 11,518,029, which is a continuation of application No. PCT/CA2018/050610, filed on May 25, 2018.

(60) Provisional application No. 62/511,123, filed on May 25, 2017.

(51) Int. Cl.
    *G05B 15/00*      (2006.01)
    *G05B 15/02*      (2006.01)
    *G05D 1/00*      (2024.01)
    *G05D 1/43*      (2024.01)

(52) U.S. Cl.
    CPC .......... *G05B 2219/31007* (2013.01); *G05B 2219/40298* (2013.01); *G05D 1/00* (2013.01); *G05D 1/02* (2013.01); *G05D 1/43* (2024.01)

(56) References Cited

U.S. PATENT DOCUMENTS

| | | | |
|---|---|---|---|
| 6,463,360 | B1 | 10/2002 | Terada et al. |
| 7,693,757 | B2 | 4/2010 | Zimmerman |
| 8,190,295 | B1 | 5/2012 | Garretson et al. |
| 8,634,981 | B1 | 1/2014 | Hyde et al. |
| 8,694,193 | B2 | 4/2014 | Mkel et al. |
| 9,114,440 | B1 | 8/2015 | Colucci et al. |
| 9,280,153 | B1 | 3/2016 | Palamarchuk et al. |
| 9,351,569 | B1 * | 5/2016 | Lucey ............... B25J 15/0273 |
| 9,358,975 | B1 | 6/2016 | Watts |
| 9,465,388 | B1 | 10/2016 | Fairfield et al. |
| 9,486,917 | B2 | 11/2016 | Reid et al. |
| 9,487,356 | B1 | 11/2016 | Aggarwal |
| 9,632,502 | B1 | 4/2017 | Levinson et al. |
| 9,733,646 | B1 | 8/2017 | Nusser et al. |
| 9,928,749 | B2 | 3/2018 | Gil et al. |
| RE47,108 | E | 10/2018 | Jacobus et al. |
| 10,112,771 | B2 | 10/2018 | D'Andrea et al. |
| 10,317,119 | B2 | 6/2019 | Zou |
| 10,328,769 | B2 | 6/2019 | Ferguson et al. |
| 10,577,199 | B2 | 3/2020 | Lee et al. |
| 11,167,964 | B2 | 11/2021 | Gariepy et al. |
| 2002/0154974 | A1 | 10/2002 | Fukuda et al. |
| 2004/0158355 | A1 | 8/2004 | Holmqvist et al. |
| 2005/0216126 | A1 | 9/2005 | Koselka et al. |
| 2007/0106306 | A1 | 5/2007 | Bodduluri et al. |
| 2007/0294029 | A1 | 12/2007 | D'Andrea et al. |
| 2008/0183599 | A1 | 7/2008 | Hill et al. |
| 2009/0012667 | A1 | 1/2009 | Matsumoto et al. |
| 2009/0043440 | A1 | 2/2009 | Matsukawa et al. |
| 2010/0021272 | A1 | 1/2010 | Ward et al. |
| 2010/0030417 | A1 | 2/2010 | Fang et al. |
| 2010/0030466 | A1 | 2/2010 | Rogers et al. |
| 2010/0049391 | A1 | 2/2010 | Nakano |
| 2010/0063680 | A1 | 3/2010 | Tolstedt et al. |
| 2010/0106356 | A1 | 4/2010 | Trepagnier et al. |
| 2010/0206651 | A1 | 8/2010 | Nagasaka |
| 2010/0316470 | A1 | 12/2010 | Lert et al. |
| 2012/0173018 | A1 | 7/2012 | Allen et al. |
| 2012/0197464 | A1 | 8/2012 | Lai et al. |
| 2012/0296471 | A1 | 11/2012 | Inaba et al. |
| 2013/0054129 | A1 | 2/2013 | Wong et al. |
| 2013/0054133 | A1 | 2/2013 | Lewis et al. |
| 2013/0086215 | A1 | 4/2013 | Trotta et al. |
| 2013/0226340 | A1 | 8/2013 | Buchstab |
| 2013/0231779 | A1 | 9/2013 | Purkayastha et al. |
| 2013/0274986 | A1 * | 10/2013 | Trepagnier ............ G01S 17/86 701/26 |
| 2014/0040431 | A1 | 2/2014 | Rao et al. |
| 2014/0188324 | A1 | 7/2014 | Waltz et al. |
| 2014/0244004 | A1 | 8/2014 | Scott et al. |
| 2014/0309833 | A1 | 10/2014 | Ferguson et al. |
| 2014/0350725 | A1 * | 11/2014 | LaFary ............... G05D 1/0274 901/50 |
| 2014/0365113 | A1 | 12/2014 | Mcgavran et al. |
| 2014/0365258 | A1 * | 12/2014 | Vestal ............ G06Q 10/063114 901/1 |
| 2015/0032252 | A1 * | 1/2015 | Galluzzo ............... B25J 9/162 700/218 |
| 2015/0088310 | A1 | 3/2015 | Pinter et al. |
| 2015/0197009 | A1 * | 7/2015 | Melikian ............... B25J 9/1669 901/47 |
| 2015/0217455 | A1 | 8/2015 | Kikkeri et al. |
| 2015/0248131 | A1 | 9/2015 | Fairfield et al. |
| 2015/0309485 | A1 | 10/2015 | Nishi |
| 2015/0343638 | A1 * | 12/2015 | Mattern ............... B25J 21/00 901/31 |
| 2015/0352721 | A1 | 12/2015 | Wicks et al. |
| 2016/0086494 | A1 | 3/2016 | Anandayuvaraj et al. |
| 2016/0101940 | A1 | 4/2016 | Grinnell et al. |
| 2016/0246301 | A1 | 8/2016 | Kazama et al. |
| 2016/0271800 | A1 | 9/2016 | Stubbs et al. |
| 2016/0327951 | A1 | 11/2016 | Walton et al. |
| 2016/0346926 | A1 * | 12/2016 | Matthias ............... B25J 9/1697 |
| 2017/0039765 | A1 | 2/2017 | Zhou et al. |
| 2017/0100837 | A1 | 4/2017 | Zevenbergen et al. |
| 2017/0113352 | A1 | 4/2017 | Lutz et al. |
| 2017/0168488 | A1 | 6/2017 | Wierzynski et al. |
| 2017/0308096 | A1 | 10/2017 | Nusser et al. |
| 2017/0341236 | A1 * | 11/2017 | Patrick ............... G05D 1/0274 |
| 2017/0351261 | A1 | 12/2017 | Levinson et al. |
| 2018/0001474 | A1 | 1/2018 | Sinyavskiy et al. |
| 2018/0009000 | A1 | 1/2018 | Shang et al. |
| 2018/0060765 | A1 | 3/2018 | Hance et al. |
| 2018/0072431 | A1 | 3/2018 | Sahu et al. |
| 2018/0086575 | A1 | 3/2018 | Mccarthy et al. |
| 2018/0190046 | A1 | 7/2018 | Levinson et al. |
| 2018/0264648 | A1 | 9/2018 | Kim et al. |
| 2018/0276595 | A1 * | 9/2018 | Gariepy .......... G06Q 10/06313 |
| 2018/0276604 | A1 * | 9/2018 | Gariepy ............... G05D 1/628 |
| 2018/0305125 | A1 * | 10/2018 | Guo ............... B25J 13/08 |
| 2018/0362270 | A1 | 12/2018 | Clucas et al. |
| 2019/0079537 | A1 | 3/2019 | Yoshida et al. |
| 2019/0129425 | A1 | 5/2019 | Drexler et al. |
| 2020/0047343 | A1 | 2/2020 | Bal et al. |
| 2020/0206928 | A1 | 7/2020 | Denenberg et al. |
| 2022/0024047 | A1 * | 1/2022 | Bouchard ......... G05B 19/41845 |
| 2022/0341906 | A1 * | 10/2022 | Lam ............... G05D 1/0287 |
| 2022/0355495 | A1 * | 11/2022 | Rembisz ............... G01C 21/206 |
| 2022/0365533 | A1 | 11/2022 | Drexler et al. |

FOREIGN PATENT DOCUMENTS

| | | |
|---|---|---|
| CN | 109187063 A | 1/2019 |
| CN | 108839025 B | 10/2020 |
| DE | 112018006030 T5 | 9/2020 |
| EP | 2385435 A1 | 11/2011 |
| JP | 2009031884 A | 2/2009 |
| JP | 2009123045 A | 6/2009 |
| WO | 2011146259 A2 | 11/2011 |

OTHER PUBLICATIONS

Padersen et al., "Robot skills for manufacturing: From concept to industrial deployment", Nov. 2014, Robotics and Computer-Integrated Manufacturing 37 (2016) 282-291. (Year: 2014).*

Wikipedia Vehicular Automation, https://web.archive.org/web/20140402022211/https://en.wikipedia.org/wiki/.

http://www.digitalglobe.com/downloaded on May 6, 2014 (3 pages).

Shneier et al., "Literature Review of Mobile Robots for Manufacturing", May 2015, NIST. (Year: 2015).

Takahashi et al., "Developing a mobile robot for transport applications in the hospital domain", Mar. 2010, Robotics and Autonomous Systems 58 (2010). Year: 2010).

Hasan et al., "An Autonomous Robot for Intelligent Security Systems", Aug. 2018, 9th IEEE Control and System Graduate Research Colloquium (ICSGRC 2018). (Year: 2018).

(56) References Cited

OTHER PUBLICATIONS

Bengel et al., "Mobile Robots for Offshore Inspection and Manipulation", Oct. 2009, the 2009 IEEE/RSJ International Conference on Intelligent Robots and Systems. (Year: 2009).

* cited by examiner

SYSTEMS AND METHODS FOR PROCESS TENDING WITH A ROBOT ARM

CROSS-REFERENCE TO RELATED PATENT APPLICATIONS

This application is a continuation of U.S. patent application Ser. No. 17/979,597, filed on Nov. 2, 2022, which is a continuation of U.S. patent application Ser. No. 16/561,519, filed on Sep. 5, 2019 (issued as U.S. Pat. No. 11,518,029), which is a continuation of PCT Patent Application No. PCT/CA2018/050610 filed on May 25, 2018, which claims the benefit of U.S. Provisional Patent Application No. 62/511,123, filed on May 25, 2017. The complete disclosure of each of U.S. patent application Ser. No. 17/979,597, U.S. patent application Ser. No. 16/561,519, PCT Patent Application No. PCT/CA2018/050610, and U.S. Provisional Patent Application No. 62/511,123 is incorporated herein by reference.

FIELD

The described embodiments relate to systems and methods for process tending, and in particular to mobile process tending with a robot arm.

BACKGROUND

Process tending generally involves moving a workpiece to the next step of a manufacturing process, positioning the workpiece so that it has a desired orientation with respect to the process step, and then interacting with the process step. Modern manufacturing processes rely on manufacturing steps, such as machines, that can be tended by industrial robot arms in order to perform process tending in place of human operators in order improve workplace safety and efficiency. The ability to move an industrial robot arm to and from a step in the process can increase the effectiveness of using a robot arm.

Current solutions for moving a robot arm to and from a machine rely on mounting the robot arm on a fixed rail. The ability of the robot to slide on a rail effectively provides an extra linear axis to the movement of the robot arm. For example, a 5-axis robot arm with the linear axis of the rail can be considered a six-axis robot arm.

However, mounting a robot arm on a rail creates substantial limitations on the overall manufacturing process and facility. For example, fixed-rail systems require significant infrastructure planning and cost. If a new or alternate machine is required for the manufacturing line, then the new or alternate machine must be able to fit in to the installed rail, and within the proper sequence and limited spacing relative to other machines in the manufacturing process. Generally, once a rail has been installed, there is limited flexibility for altering a manufacturing process, and any alterations are expensive due to the impact on the fixed-rail infrastructure.

SUMMARY

In a first aspect, there is a system for process tending. The system comprises a server, a self-driving vehicle, and a robot arm mounted on the vehicle. The server provides at least one of a process location and a machine identifier. The self-driving vehicle has a vehicle control system for storing a map and for receiving a waypoint based on at least one of the process location and the machine identifier. The robot arm has a robot arm control system for storing programs executable by the robot arm. The vehicle control system autonomously navigates the self-driving vehicle to the waypoint based on the map, and the robot arm control system selects a target program from the programs based on at least one of the process location and the machine identifier.

According to some embodiments, the self-driving vehicle has safety sensors in communication with the vehicle control system for sensing a vehicle obstacle in the environment of the self-driving vehicle. The vehicle control system can autonomously navigate the self-driving vehicle to the waypoint based on the map and the vehicle obstacle.

According to some embodiments, the robot arm control system has robot arm safety sensors in communication with the robot arm control system for sensing robot arm obstacles in the environment of the robot arm. The robot arm control system can alter the movement of the robot arm based on the robot arm obstacle.

According to some embodiments, the vehicle safety sensors are configured to detect the vehicle obstacles based on a vehicle-safety field of view, and the robot arm safety sensors are configured to detect the robot arm obstacles based on a robot-arm-safety field of view. At least one part of the vehicle-safety field of view does not overlap with the robot-arm-safety field of view.

In a second aspect, there is a method for process tending with a robot arm. The method comprises receiving a waypoint associated with a process location, selecting, with a controller of the robot arm, a program to be executed by the robot arm based on the process location, transporting the robot arm to the waypoint with a self-driving vehicle, and executing the program with the robot arm at the waypoint.

According to some embodiments, the transporting the robot arm to the waypoint with the self-driving vehicle comprises planning a path to the waypoint with the self-driving vehicle, sensing an obstacle along the path with the self-driving vehicle, planning a new path to the waypoint based on the obstacle, and transporting the robot arm with a self-driving vehicle according to a new path.

According to some embodiments, selecting the program comprises determining a machine identifier based on the process location, and selecting the program based on the machine identifier.

According to some embodiments, determining the machine identifier based on the process location comprises capturing a machine image with a sensor and determining the machine identifier based on the machine image.

According to some embodiments, the waypoint is a first waypoint associated with a first process location, and the program is a first program to be executed by the robot arm based on the first process location. The method may further comprise receiving a second waypoint associated with a second process location, selecting, with the controller of the robot arm, a second program to be executed by the robot arm based on the process location, subsequent to executing the first program with the robot arm at the first waypoint, transporting the robot arm to the second waypoint with the self-driving vehicle, and executing the program with the robot arm at the second waypoint.

According to some embodiments, the method may further comprise, prior to executing the first program, selecting a first tool based on the first process location and attaching the first tool to the robot arm. Subsequent to executing the second program, selecting a second tool based on the second process location, removing the first tool from the robot arm, and attaching the second tool to the robot arm.

According to some embodiments, the method may further comprise updating the waypoint to a new waypoint based on a new process location, transporting the robot arm to the new waypoint with the self-driving vehicle, and executing the program with the robot arm at the new waypoint.

In a third aspect, there is a method for processing tending with a robot arm. The method comprises receiving a machine identifier associated with a process, with a controller of the robot arm, a program to be executed by the robot arm based on the machine identifier, determining a waypoint based on the machine identifier, transporting the robot arm to the waypoint with a self-driving vehicle, and executing the program with the robot arm at the waypoint.

According to some embodiments, transporting the robot arm to the waypoint with the self-driving vehicle comprises planning a path to the waypoint with the self-driving vehicle, sensing an obstacle along the path with the self-driving vehicle, planning a new path to the waypoint based on the obstacle, and transporting the robot arm with the self-driving vehicle according to the new path.

According to some embodiments, the machine identifier may be a first machine identifier associated with a first process, the waypoint may be a first waypoint associated with the first process, and the program may be a first program to be executed by the robot arm based on the first machine identifier. The method may further comprise receiving a second machine identifier with a second process, selecting, with the controller of the robot arm, a second program to be executed by the robot arm based on the second machine identifier, determining a second waypoint based on the second machine identifier, transporting the robot arm to the second waypoint with the self-driving vehicle, and executing the second program with the robot arm at the second waypoint.

According to some embodiments, the method may further comprise updating the machine identifier to a new machine identifier, selecting, with the controller of the robot arm, a new program to be executed by the robot arm based on the new machine identifier, transporting the robot arm to the waypoint with the self-driving vehicle, and executing the new program with the robot arm at the waypoint.

In a fourth aspect, there is a system for process tending. The system comprises a self-driving vehicle, a robot arm, a robot arm control system, and robot arm safety sensors. The self-driving vehicle has vehicle safety sensors and a vehicle control system in communication with the vehicle safety sensors. The robot arm control system is in communication with the robot arm safety sensors. The vehicle control system is capable of controlling the vehicle based on the robot arm safety sensor, and the robot arm control system is capable of controlling the robot arm based on the vehicle safety sensor.

According to some embodiments, the vehicle safety sensors may be configured to detect vehicle obstacles within a vehicle-safety field of view, and the robot arm safety sensors may be configured to detect robot arm obstacles within a robot-arm safety field of view. At least one part of the vehicle-safety field of view does not overlap with the robot-arm-safety field of view.

According to some embodiments, the vehicle control system and the robot arm control system are configured to operate in a first mode in which the robot arm control system prevents the robot arm from moving within a perimeter of the vehicle, and the vehicle control system controls the vehicle based on the vehicle safety sensors and not based on the robot arm safety sensors.

According to some embodiments, the vehicle control system and the robot arm control system are configured to operate in a second mode in which the vehicle control system controls the vehicle based on the vehicle safety sensors and the robot arm safety sensors.

According to some embodiments, the vehicle control system and the robot arm control system are configured to operate in a first mode in which the vehicle control system prevents the vehicle from moving, and the robot arm control system controls the robot arm based on the robot arm safety sensors and not based on the vehicle safety sensors.

According to some embodiments, the vehicle control system and the robot arm control system are configured to operate in a second mode in which the robot arm control system controls the robot arm based on the vehicle safety sensors and the robot arm safety sensors.

In a fifth aspect, there is a method of operating a self-driving vehicle carrying a robot arm. The method comprises controlling a movement of the self-driving vehicle using a vehicle control system and vehicle safety sensors, receiving, with the vehicle control system, a robot arm safety signal from a robot arm control system, and altering the movement of the vehicle using the vehicle control system based on the robot safety signal.

According to some embodiments, the robot arm safety signal is generated by the robot arm control system based on the robot arm safety sensors.

According to some embodiments, the robot arm safety signal is generated in response to a robot arm safety sensor detecting an obstacle within a robot-arm-safety field of view.

According to some embodiments, the robot arm safety signal is generated by the robot arm control system based on a robot-arm-operating mode.

In a sixth aspect, there is a method of operating a robot arm mounted on a self-driving vehicle. The method comprises controlling a movement of the robot arm using a robot arm control system and robot arm safety sensors, receiving, with the robot arm control system, a vehicle safety signal from a vehicle control system, and altering the movement of the robot arm using the robot arm control system based on the vehicle safety signal.

According to some embodiments, the vehicle safety signal is generated based on the vehicle safety sensors.

According to some embodiments, the vehicle safety signal is generated in response to a vehicle safety sensor detecting an obstacle within a vehicle-safety field of view.

According to some embodiments, the vehicle safety signal is generated by the vehicle control system based on a speed of the vehicle.

According to some embodiments, the vehicle safety signal is generated when the speed of the vehicle exceeds a pre-determined safe-speed threshold.

According to some embodiments, the vehicle safety signal is generated based on a location of the vehicle.

According to some embodiments, the vehicle safety signal is generated based on a vehicle-operating mode.

BRIEF DESCRIPTION OF THE DRAWINGS

A preferred embodiment of the present invention will now be described in detail with reference to the drawings, in which.

DESCRIPTION OF EXEMPLARY EMBODIMENTS

As referred to herein, rail-mounted robots differ from self-driving vehicles by the degree of automation and autonomy of each. In particular, rail-mounted robots are considered to be automated, since they rely on the arbitrary displacement of the robot arm along the rail in order to navigate. For example, the robot arm may be navigated from one pre-determined location on the rail to another. In contrast, self-driving vehicles are considered to be autonomous, since they are capable of sustaining high levels of navigational performance in an uncertain or unknown environment. A person skilled in the art will appreciate that self-driving vehicles represent an entirely new paradigm of navigation as compared to a rail-mounted robot.

Figure 1:
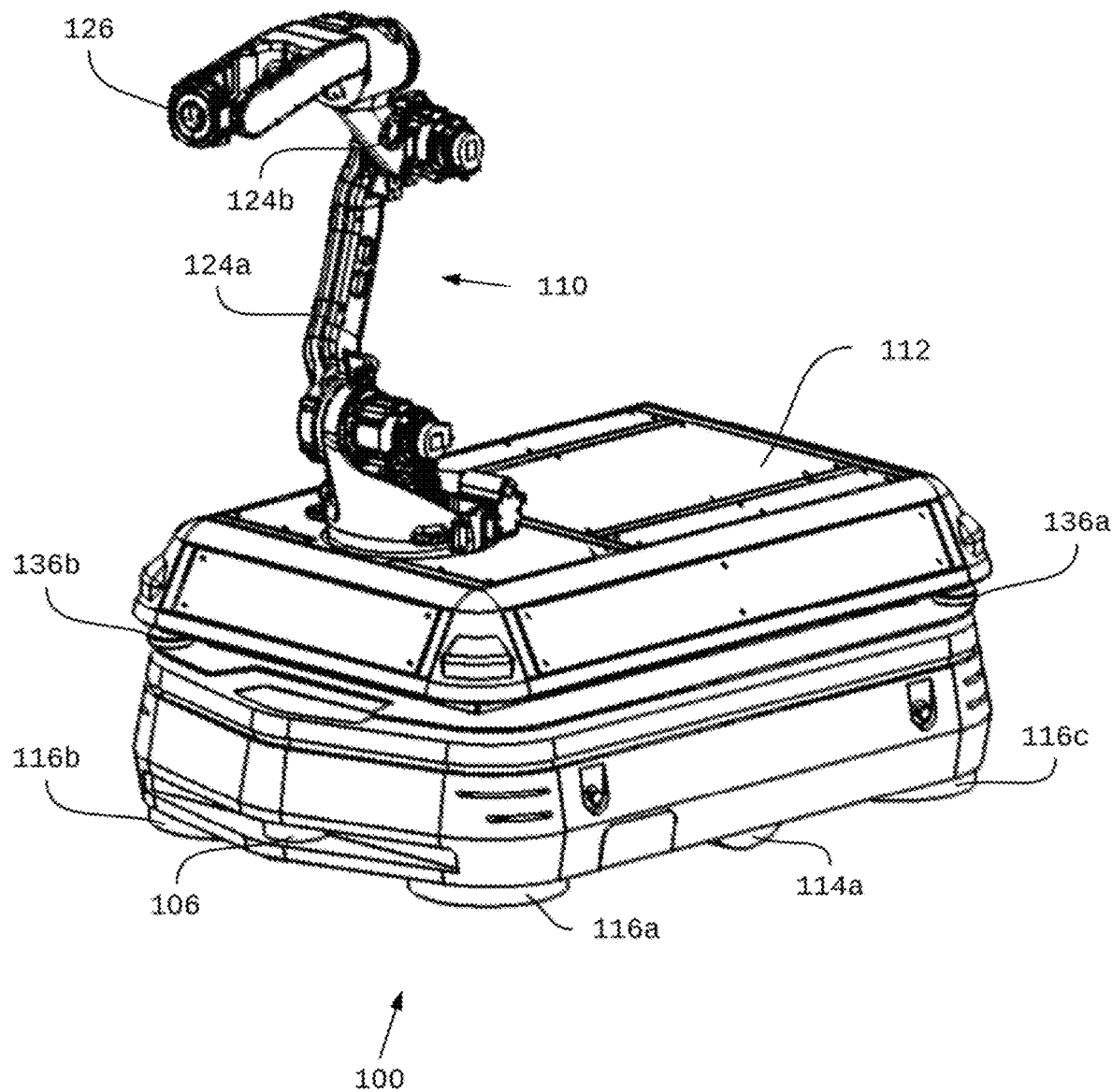
FIG. 1 is an isometric view of a self-driving vehicle carrying a robot arm and robot arm control system according to some embodiments.

Referring to FIG. 1, there is shown a self-driving vehicle 100 according to some embodiments. The self-driving vehicle 100 has at least one drive wheel 114a (and other not shown, generally and collectively referred to as the drive wheel(s) 114) and turning wheels 116a, 116b, and 116c (and others not shown, generally and collectively referred to as the turning wheel(s) 116). The combination of the drive wheels 114 and the turning wheels 116 enable the vehicle 100 to move in any direction in a plane, for example, the floor of an industrial facility, independent of other physical infrastructure in the facility. The vehicle 100 includes at least one sensor 106 for providing safety and/or location and mapping functionality related to the autonomous navigation of the vehicle 100.

A robot arm 110 is mounted on the vehicle 100. Along with the robot arm 110 is a robot arm control system 112 for controlling the movement of the robot arm 110. The robot arm 110 comprises arm segments 124a and 124b that can be independently displaced. On the end of the arm segment 124b is a tool 126 for providing a particular process-tending function. In addition to the vehicle's sensors, sensors 136a and 136b are included in order to provide safety functionality with respect to the movement of the robot arm 110.

As used herein, "process" refers to a step in an overall manufacturing process that is generally performed on a workpiece. After completing all of the processes in a manufacturing process, raw materials (inputs to the process) are converted into finished workpieces. According to some embodiments, a process may be associated with a particular machine that alters the workpiece towards becoming a finished workpiece. In some cases, a process may be conducted at a particular location, though it is also possible that some processes may be conducted in transit (for example on board a self-driving vehicle).

Figure 2:
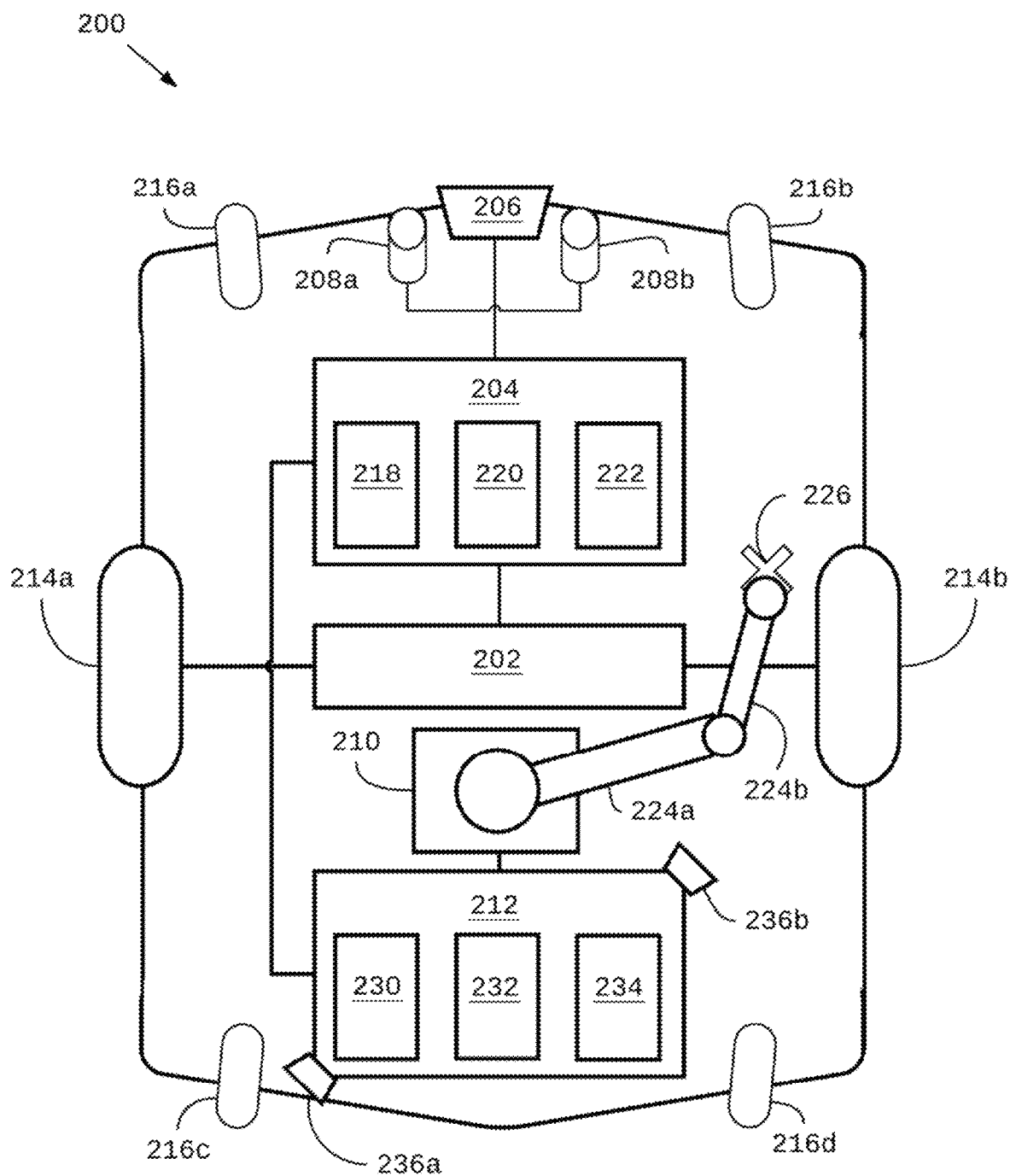
FIG. 2 is system diagram of the self-driving vehicle, robot arm, and robot arm control system of FIG. 1.

Referring to FIG. 2, there is shown a self-driving vehicle 200 according to some embodiments. The vehicle comprises a drive system 202, a vehicle control system 204, and one or more sensors 206, 208a, and 208b. A robot arm 210 and a robot arm control system 212 are mounted on the vehicle 200. The elements of FIG. 2 are numbered in accordance with FIG. 1, with similar elements being labelled with similar numbers.

The drive system 202 includes a motor and/or brakes connected to drive wheels 214a and 214b for driving the vehicle 200. According to some embodiments, the motor may be an electric motor, combustion engine, or a combination/hybrid thereof. Depending on the particular embodiment, the drive system 202 may also include control interfaces that can be used for controlling the drive system 202. For example, the drive system 202 may be controlled to drive the drive wheel 214a at a different speed than the drive wheel 214b in order to turn the vehicle 200. Different embodiments may use different numbers of drive wheels, such as two, three, four, etc.

According to some embodiments, additional wheels 216 may be included (as shown in FIG. 2, the wheels 216a, 216b, 216c, and 216d may be collectively referred to as the wheels 216). Any or all of the additional wheels 216 may be wheels that are capable of allowing the vehicle 200 to turn, such as castors, omni-directional wheels, and mecanum wheels.

The vehicle control system 204 comprises a processor 218, a memory 220, and a computer-readable non-transitory medium 222. According to some embodiments, the vehicle control system 204 may also include a communications transceiver (not shown in FIG. 2), such as a wireless transceiver for communicating with a wireless communications network (e.g. using an IEEE 802.11 protocol or similar).

One or more sensors 206, 208a, and 208b may be included in the vehicle 200. For example, according to some embodiments, the sensor 206 may be a LiDAR device (or other optical/laser, sonar, or radar range-finding sensor). The sensors 208a and 208b may be optical sensors, such as video cameras. According to some embodiments, the sensors 208a and 208b may be optical sensors arranged as a pair in order to provide three-dimensional (e.g. binocular or RGB-D) imaging.

The particular sensors 206, 208a and 208b are shown in FIG. 2 to represents an embodiment, and to also provided for ease of explanation. Generally, the sensors 206, 208a and 208b may be described with respect to multiple purposes. For example, one purpose is to contribute to the localization and mapping functions that are performed by the vehicle control system 204. Another purpose is to provide safety features for the vehicle 200 via the vehicle control system 204. For the sake of explanation, and according to some embodiments, the sensor 206 may provide safety functionality by scanning a particular field of view so that, if an obstacle is detected with the field of view, the control system 204 will stop the vehicle 200 in order to prevent a collision with the obstacle. According to some embodiments, both of these "purposes" may be integrated into a single purpose or function.

The vehicle control system 204 uses the medium 222 to store computer programs that are executable by the processor 218 (e.g. using the memory 216) so that the vehicle control system 204 can provide automated or autonomous operation to the vehicle 200. Furthermore, the vehicle control system 204 may also store an electronic map that represents the known environment of the vehicle 200, such as a manufacturing facility, in the media 222.

For example, the vehicle control system 204 may plan a path for the vehicle 200 based on a known destination location and the known location of the vehicle. Based on the planned path, the vehicle control system 204 may control the drive system 202 in order to drive the vehicle 200 along the planned path. As the vehicle 200 is driven along the planned path, the sensors 206, and/or 208a and 208b may update the vehicle control system 204 with new images of the vehicle's environment, thereby tracking the vehicle's progress along the planned path and updating the vehicle's location. In other embodiments, the vehicle control system 204 may rely in part or in whole on a user-defined path.

Since the vehicle control system 204 receives updated images of the vehicle's environment, and since the vehicle control system 204 is able to autonomously plan the vehicle's path and control the drive system 202, the vehicle control system 204 is able to determine when there is an obstacle in the vehicle's path, plan a new path around the obstacle, and then drive the vehicle 200 around the obstacle according to the new path.

The robot arm 214 is an industrial robot that is capable of moving in two or more axes through the displacement of arm segments 224a and 224b (referred to collectively or individually as arm segment(s) 224). According to some embodiments, the robot arm 214 may have any number of arm segments, thereby being defined by more than one degree of freedom. The robot arm 214 is capable of executing a program in order to displace any of the arm segments 224 in a particular sequence and/or timing, in order to perform a particular process-tending task. For example, the robot arm 214 may be used to perform a pre-determined sequence of steps in order to manipulate a workpiece through a process in a computer numerical control ("CNC") machine, or to place a weld on a workpiece, etc.

According to some embodiments, A tool 226 (e.g. an end-effector) may be attached to the robot arm 214. For example, the tool 226 may be a gripper, manipulator, spot welders, laser welders, etc. The tool 226 may be permanently installed on the robot arm 214, or the tool 226 may be removable so that alternate tools can be placed on the robot arm. According to some embodiments, alternative tools and/or a tool-changing appliance may also be carried on the vehicle 200.

The robot arm control system 212 comprises a processor 230, a memory 232, and a computer-readable non-transitory medium 234. According to some embodiments, the robot arm control system 212 may also include a communications transceiver (not shown in FIG. 2), such as a wireless transceiver for communicating with a wireless communications network (e.g. using an IEEE 802.11 protocol or similar).

The particular robot arm control system 212 is shown in FIG. 2 represents an embodiment, and is also provided for ease of explanation. According to some embodiments, any or all of the processor 230, the memory 232, the medium 234, and the wireless transceiver (not shown) may be shared with the respective analogous components of the vehicle control system 204. For example, in some embodiments, a single system may provide both the vehicle control system 204 and the robot arm control system 212. In some embodiments, the vehicle control system 204 and the robot arm control system 212 may each have their own processors, memory, and media, but may be connected via a wired communications link or bus, and share a single wireless transceiver.

The medium 234 of the robot arm control system 212 stores programs that are executable by the robot arm 210. According to some embodiments, the medium 234 may comprise computer instructions which, when executed, cause the processor 230 to be configured to execute methods for activating a servo or actuator that displace the arm segments 224 and/or the tool 226.

Robot arm safety sensors 236a and 236b (collectively referred to as the robot arm safety sensor(s) 236) may be mounted anywhere on the vehicle 200, the robot arm control system 212, or the robot arm 210. According to some embodiments, the robot arm safety sensors 236 may provide safety functionality by scanning a particular field of view. Generally, this field of view is determined with respect to the range of motion of the robot arm 210 such that, if an object is detected within the field of view, the robot arm control system 212 stops the movement of the robot arm 210 in order to avoid a collision between the robot art 210 and the obstacle. In other embodiments, the robot arm safety sensors 236 may provide safety functionality by sensing direct physical contact (via a contact sensor, emergency stop button, or the like).

According to some embodiments, the vehicle 200 may receive a mission schedule from a fleet-management system or other external computer system in communication with the vehicle 200 (e.g. in communication via the transceiver in the vehicle control system 204). In this case, the schedule contains one or more process locations or machine identifiers. Based on a process location associated with the schedule, the vehicle 200, based on the vehicle control system 204, can autonomously navigate to the process location without receiving any other instructions from an external system. For example, the vehicle control system 204, along with the sensors 206, and/or 208a, and 208b, enable the vehicle 200 to navigate without any additional navigational aids such as navigational targets, magnetic strips, paint/tape traces, or rails installed in the environment in order to guide the vehicle 200.

Figure 3:
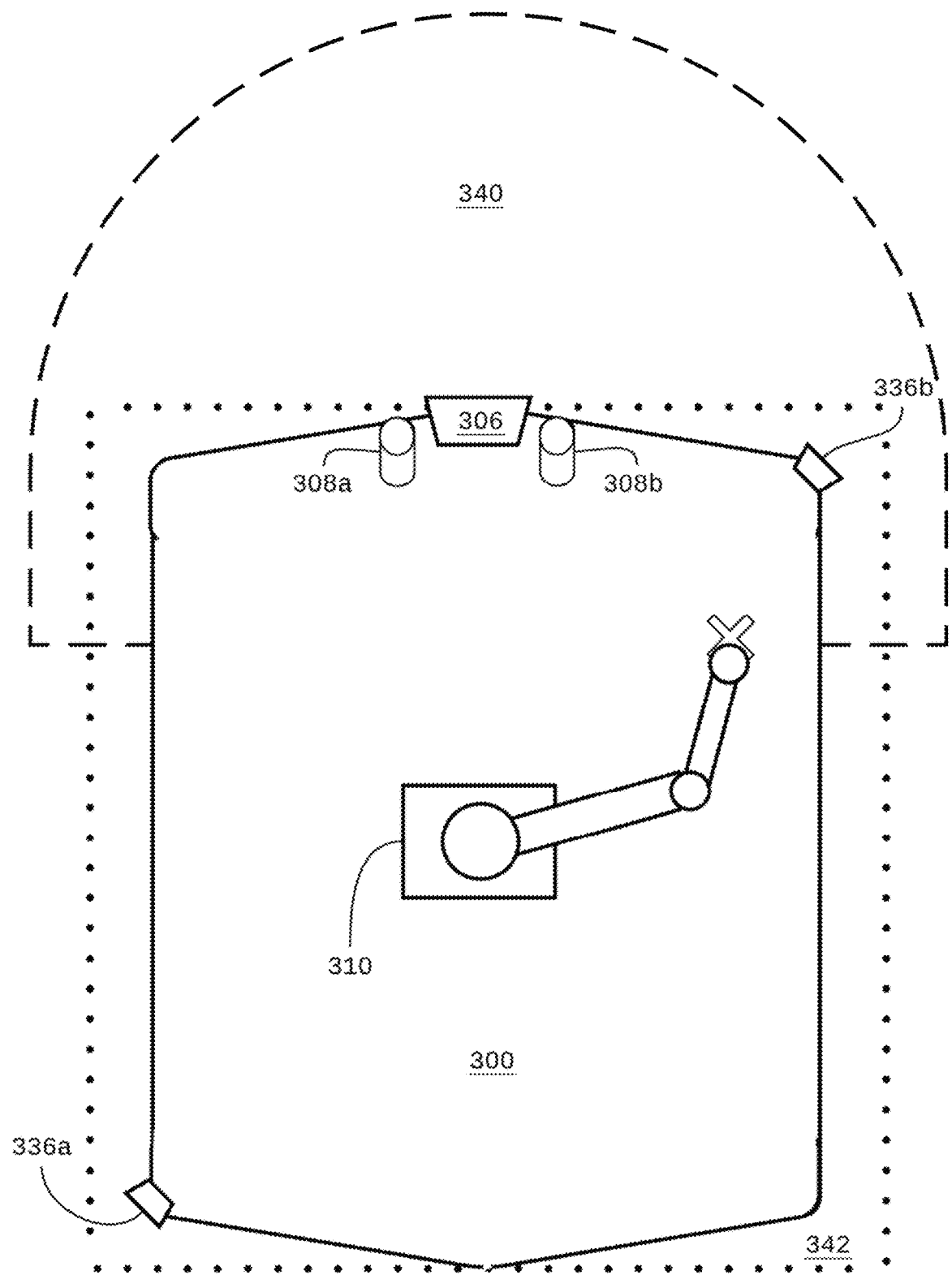
FIG. 3 is a system diagram of the self-driving vehicle and robot arm of FIG. 2 showing a vehicle safety field of view and a robot arm safety field of view in plan view.

Referring to FIG. 3, there is shown a self-driving vehicle 300 with a robot arm 310 mounted. The elements of FIG. 3 are numbered in accordance with FIG. 1 and FIG. 2, with similar elements being labelled with similar numbers. For the sake and ease of explanation, some components are not shown in FIG. 3.

The vehicle 300 includes sensors 306, 308a, and 308b. According to some embodiments, the sensors 306, 308a, and 308b may perform multiple functions. For example, the sensors 306, 308a, and 308b may be used for detecting objects in the vehicle's environment, mapping the environment, and locating the vehicle 300 relative to the map stored in the vehicle control system. The sensors 306, 308a, and 308b may also provide safety functionality. For example, if an object is detected within the periphery of the vehicle 300, the vehicle's control system may be activated to stop the vehicle 300 or otherwise alter the vehicle's motion in order to avoid a collision with the detected object.

According to some embodiments, any or all of the sensors 306, 308a, and 308b may be use to provide any or all of the sensor functions described (e.g. mapping, localization, mapping). In the example shown in FIG. 3, it can be assumed that the sensor 306 provides safety functionality.

The sensor 306 (e.g. a LiDAR scanner, or vision system) defines a particular field of view 340 as enclosed by the dashed line in FIG. 3 that is relevant to the vehicle's safety system. Generally, the field of view 340 can be defined in terms of an angle and a depth. As shown, the field of view 340 extends forward and to the sides of the vehicle 300. According to some embodiments, other sensors may be included on the rear of the vehicle in order to define an associated field of view that extends behind the vehicle (not shown). Since the field of view 340 is associated with the safety of the vehicle 300, the field of view 340 is intended to detect object with which the vehicle 300 might collide if the vehicle's control system does not otherwise change the motion of the vehicle 300. In other words, according to some embodiments, the field of view 340 may be established in order to exclude objects with which the vehicle 300 is unlikely to collide, with respect to, for example, the speed and direction of travel of the vehicle 300.

According to some embodiments, a different field of view may be determined with respect to other functionalities of the sensors 306, 308a, and 308b, such as mapping and localization. Thus, the sensors may sense a particular object for the purposes of mapping and/or localization, even though the object is not within the field of view 340. In other words, an object may be interesting for localization and/or mapping, but not with respect to safety.

A second field of view 342, as enclosed by the stippled line in FIG. 3, is similarly established in association with the robot arm sensors 336a and 336b. As with the field of view 340, the field of view 342 is established in consideration of safety and avoiding collisions with objects such as human beings or other equipment. Whereas the field of view 340 is associated with safety as relevant to the motion of the vehicle 300, the field of view 342 is associated with safety as relevant to the motion of the robot arm 310. As shown in FIG. 3, the field of view 342 is determined in order to cover the maximum displacement range of the robot arm 310.

A first set of sensors 306, 308a, and 308b are associated with a first safety field of view 340 in respect of the vehicle 300, and a second set of sensors 336 are associated with a second safety field of view 342 in respect of the robot arm 310 in order to address safety concerns based on different modes of operation of the vehicle 300 and the robot arm 310. Depending on the mode of operation, one or both of the fields of view 340 and 342 may be used or ignored in order to provide safety signals to the vehicle control system and/or the robot arm control system.

According to some embodiments, a first mode of operation is defined in which the vehicle 300 is transporting the robot arm 310 and/or a workpiece or inventory item from one location in an industrial facility to another. In this mode, the robot arm 310 may be placed in a travel position so that the robot arm 310 does not extend beyond the perimeter of the vehicle 300. According to some embodiments, in the first mode, the robot arm control system may lock the position of the robot arm 310 in order to prevent any movement of the robot arm 310 while the vehicle 300 is travelling. According to some embodiments, the vehicle control system may send a speed-based safety signal to the robot arm control system so that, whenever the vehicle 300 is travelling above a threshold safe speed, the robot arm control system prevents the robot arm 300 from moving. When operating in the first mode, the vehicle control system considers the vehicle field of view 340 in order to provide safety and collision avoidance based on the motion of the vehicle 300. However, according to some embodiments, when operating in the first mode, the field of view 342 may not be considered with respect to safety and collision avoidance, since it may be assumed that the robot arm 310 does not extend beyond the perimeter of the vehicle 300 and/or the robot arm 310 may be locked from moving.

According to some embodiments, a second mode of operation is defined in which the vehicle 300 is transporting the robot arm 310 while the robot arm 310 may be operable, may be extending beyond the perimeter of the vehicle 300, or may otherwise represent a hazard in addition to the vehicle 300 itself. When operating in the second mode, the vehicle control system considers the vehicle field of view 340 as well as the robot arm field of view 342 or subsets thereof in order to provide safety and collision avoidance based on the motion of the vehicle 300. As previously described, various configurations are possible in which the robot arm sensors 336 can be used to signal the vehicle control signal. For example, the robot arm sensors 336 may communicate directly with the vehicle control system, or the robot arm sensors 336 may communicate with the vehicle control system via the robot arm control system. In the second mode of operation, both fields of view 340 and 342 can be considered in order to provide safety and collision avoidance based on the motion of the vehicle 300 and the additional motion and/or presence of the robot arm 310 on the vehicle 300. In other words, according to some embodiments, the presence of the robot arm 310 on the vehicle 300 may represent additional hazards based on the motion of the vehicle 300 that would not be properly addressed solely by the vehicle field of view 340.

Figure 4:
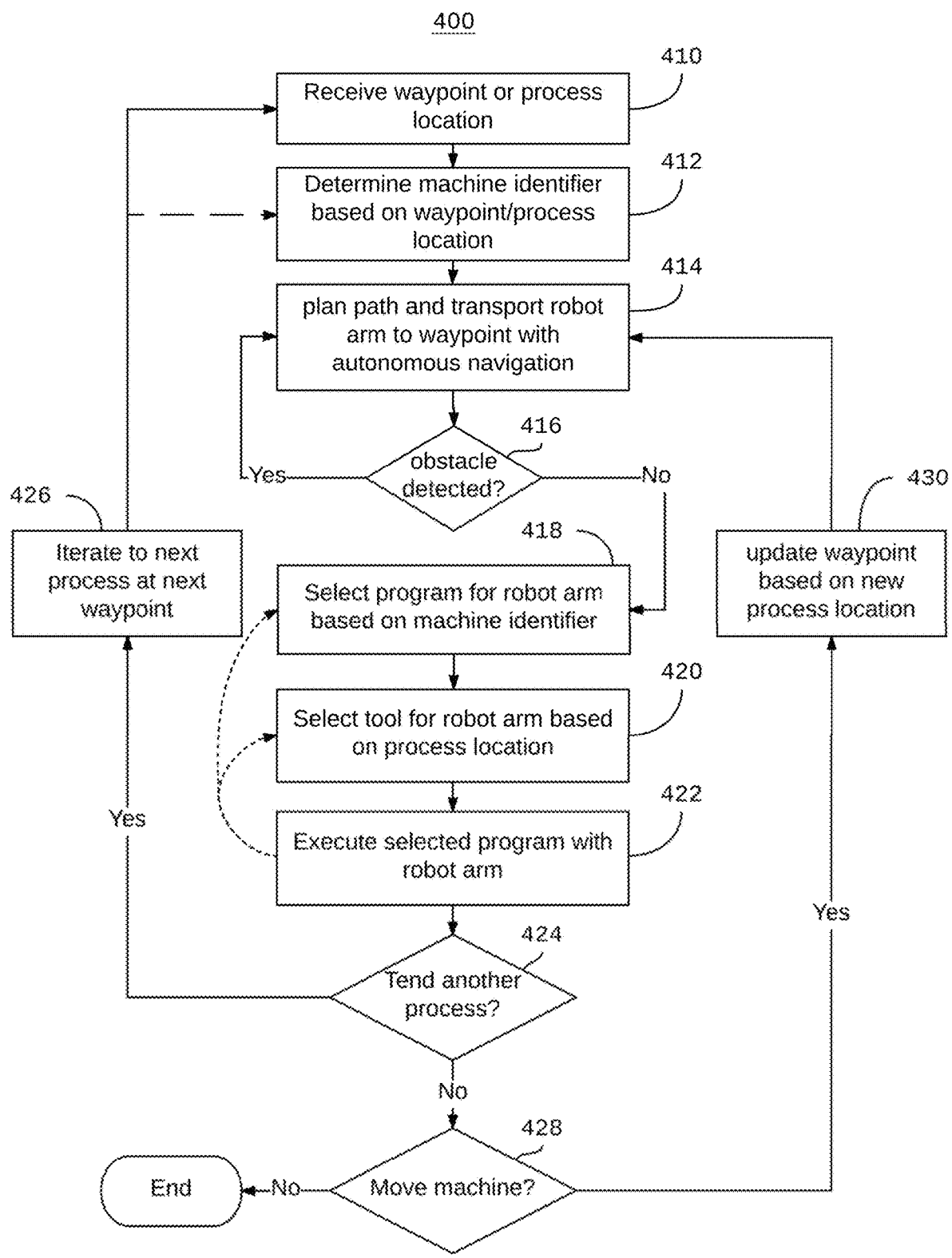
FIG. 4 is a flow diagram depicting a method for machine tending with a robot arm according to some embodiments.

Referring to FIG. 4, there is shown a method 400 of process tending with a robot arm. The method 400 may be implemented using one or more computer processors along with a self-driving vehicle and a robot arm mounted on the self-driving vehicle. Non-transitory computer-readable media may store computer-readable instructions for configuring the one or more processors to execute the steps of the method 400.

The method begins at step 410, when a waypoint associated with a process location is received. Ultimately, the waypoint will be received by the vehicle's control system so that the vehicle can navigate autonomously based on the waypoint.

A waypoint, as used herein, is a location defined relative to the electronic map stored in the vehicle control system. Generally, a waypoint may be associated with a process location. For example, a process location may be the location of a particular machine in the facility, and the waypoint may be a location on the electronic map associated with the process location. In some cases the waypoint may be effectively the same as the process location, whereas in some cases, the waypoint may be adjacent to the process location in order to allow the vehicle to approach the process location from a particular direction, and/or allow the robot arm to be positioned and maneuverable with respect to the process location.

According to some embodiments, waypoint may be associated with a general area or region of a facility, such that, when the vehicle autonomously navigates to the waypoint, the vehicle uses its sensors to detect and identify particular machines and process locations within the area or region. After identifying a particular machine or process location, the vehicle is subsequently able to precisely navigate to the process location.

According to some embodiments, a waypoint or process location may be received from an enterprise resource planning system ("ERP"), a manufacturing engineering system ("MES"), and/or a fleet-management system. In some cases, one or both of an ERP system and an MES may be used. In some cases, the ERP and MES may be part of the same system. Either or both of the ERP and MES may communicate directly with the vehicle or the robot arm.

Generally, a waypoint is associated with a process location as previously described. The associations between waypoint and process locations may be stored at any one of the fleet-management system, vehicle control system, robot arm control system, ERP, and MES. As such, according to some embodiments, any one of these systems may be able to provide a waypoint associated with a given process location, or provide a process location associated with a given waypoint. With this in mind, the following description will refer to waypoints only, for the sake of explanation.

According to some embodiments, the waypoint may be received from an ERP and/or MES via the fleet-management system. In some cases, the fleet-management system may be integrated into a single system along with an ERP and/or MES.

The waypoint may be received by the vehicle directly, or by the vehicle via the robot arm. For example, in some embodiments, an ERP and/or MES may send a schedule of process-tending missions, including one or more waypoints, to a fleet-management system. The fleet-management system may then select a particular self-driving vehicle to perform a mission. For example, the fleet-management system may select a vehicle from among a fleet of vehicles, based on the type of robot arm that is mounted on the vehicle, the availability of the vehicle (and mounted robot arm), etc. The fleet-management system may then send the waypoint to the selected vehicle so that the selected vehicle can autonomously navigate to the waypoint.

In another example, the ERP or MES may be in communication with the robot arm (e.g. using the robot arm's control system). In this case, the robot arm may receive the waypoint from the ERP or MES, and may then provide the waypoint to the vehicle control system so that the vehicle can autonomously navigate to the waypoint. According to some embodiments, the robot arm may receive a process location and provide the process location to the vehicle control system. The vehicle control system may then determine an associated waypoint, directly, or via the fleet-management system.

At step 412, according to some embodiments, a machine identifier may be determined based on the waypoint or associated process location. For example, a machine identifier may be used to uniquely identify the type of machine, or a unique machine (e.g. within a group of machines of the same type), or a unique process to be executed on a machine (e.g. for a particular machine). According to some embodiments, the machine identifier may be useful for subsequently determining the particular program that is to be executed by the robot arm in association with the process. For example, a particular type of CNC machine may be used in multiple instances within a facility, for executing the same process on multiple parts in parallel, or for executing different processes. Furthermore, the same machine may be used to execute different processes on different parts at different times. Generally, the machine identifier is determined in order to identify the particular program that should be executed by the robot arm.

According to some embodiments, a machine identifier may not be necessary, and the method may proceed based on the waypoint or process location alone.

At step 414, the vehicle, using its control system, plans a path to the waypoint. According to some embodiments, the vehicle's control system may use a map of the vehicle's environment (e.g. an industrial facility) stored in the control system to plan a path from the vehicle's current location to the waypoint.

The vehicle transports the robot arm to the waypoint based on the planned path, for example, using the vehicle's drive system and control system. According to some embodiments, as the vehicle is transporting the robot arm, the vehicle's sensors are scanning the vehicle's peripheral environment.

If the vehicle's sensors detect an obstacle on (or in the periphery of) the planned path, then, at step 416, the method returns to step 414, and a new path is planned based on the vehicle's current location, the waypoint, and the detected obstacle. Subsequently, the vehicle continues to transport the robot arm to the waypoint based on the new path that was planned, thereby using autonomous navigation to avoid the obstacle.

If no obstacle is detected, then at step 416, the vehicle continues to transport the robot arm to the waypoint based on the current path. According to some embodiments, the steps 416 and 414 may be executed periodically or continuously throughout the method 400 such that the vehicle is always navigating autonomously in order to avoid collisions with detected obstacles. The particular order of the steps 414 through 420 are shown in FIG. 4 for the purposes of explanation.

At step 418, a program to be executed by the robot arm is selected. Generally, if a machine identifier was determined during the step 412, then the program is selected based on the machine identifier. In some cases, the machine identifier may not be required in order to select the program, in which case, the program is selected based on the process location or waypoint. For example, if a single type of machine is known to perform a single process at a particular location, then it might not be necessary to use a machine identifier, since, in this case, there is a one-to-one relationship between the process location and the program to be executed at the process location. In other words, in some cases, the process location may itself be the machine identifier.

One or more programs may be stored in the robot arm control system. For example, a program may be a script or macro set of instructions that are executed by the robot arm. In some cases, the program may be pre-determined, such as by a human programmer, based on the type of machine, the process to be performed by the machine, and/or the orientation of the robot arm relative to the machine.

According to some embodiments, any one of an ERP, MES, fleet-management system, robot arm control system, and vehicle control system may store a table or other data that associates the machine identifier or process location with a particular program. In this way, when the machine identifier (or process location, as the case may be) is known, an associated program can be selected from the one or more programs stored in the robot arm control system.

In some cases, the machine identifier determined at step 412 may be a program identifier that directly identifies the program to be selected from the programs stored in the robot arm control system. In other words, it may not be necessary to use a table or other data that associates the machine identifier with a particular program. For example, an ERP and/or MES system may send a program identifier as a part of a mission schedule to the fleet-management system or directly to the robot arm or vehicle.

At step 420, a tool (e.g. end effector) may be selected for use by the robot arm. According to some embodiments, a particular program for execution may be selected at step 418, and, similarly, a particular tool may also be selected. For example, tools may include various types of grippers, spot welders, laser welders, etc. According to some embodiments, the tool may be selected based on the process location, waypoint, or machine identifier (for example, in a similar manner as previously described for the selection of the program), or based on the selected program. According to some embodiments, the vehicle may carry an assortment of tools from which one can be selected, as well as a tool-changing appliance so that the tool on the end of the robot arm can be changed without human intervention.

According to some embodiments, more than one program may be executed at the process location and/or a program may be executed using more than one tool. As indicated by the stippled lines in FIG. 4, the method may return to step 418 so that a different program can be subsequently executed after a previous program was executed at step 422. For example, a first program may be used to load a workpiece into a process. A second program may be used to orient the workpiece in the process. A third program may be used to unload the workpiece from the process. In some embodiments, the loading, orientation, and unloading may be performed based on a single program, while in other embodiments, each of the loading, orientation, and unloading may be performed based on a sequence of different programs. In the case that each is performed based on a sequence of different programs, the method may loop through steps 418 and 422 for each program.

Similarly, the method may loop through steps 420 and 422. For example, a first program may be used to load a workpiece with a manipulator tool. A second program may be used to place a weld on the workpiece using a welding tool. A third program may be used to unload the workpiece with a manipulator tool. In this case, the method may loop through step 420 so that the tool can be changed from the manipulator tool to the welding tool and back to the manipulator tool accordingly.

At some point throughout the course of executing steps 414 to 420, the vehicle transports the robot arm to the waypoint. Once the vehicle is at the waypoint, then, at step 422, the selected program is executed in the process, thereby tending the process.

According to some embodiments, when a robot arm is mounted on a self-driving vehicle, the robot arm and self-driving vehicle can be used to tend processes at different locations. For example, as previously described, an ERP and/or MES may send a schedule of process-tending missions including more than one process location to a fleet-management system. In another example, a robot arm may be transported to a first waypoint associated with a first process in order to execute a first program, and, subsequently, the vehicle may receive a second waypoint to which the robot arm is to be transported in order to execute a second program at a second process.

If, at step 424, the robot arm and self-driving vehicle are required to tend another process, then the method returns to step 410. When the method 400 is executed on this iteration (subsequent to executing steps 422 and 424), a new waypoint may be received at step 410, or, in some cases, the new waypoint may have been received at the same time as the previous waypoint. In other words, as previously described, multiple waypoints can be received as a part of a single schedule, or they may be received on an as-needed or "real-time" or "just-in-time" basis.

As indicated by the dashed line in FIG. 4, in some cases, iterating through the method 400 in order to have the robot arm and vehicle tend another process may involve determining a new machine identifier. For example, if the new process location, waypoint, or machine identifier is already known (for example, previously provided in a schedule), then the decision to tend another machine 424 may be analogous to iterating to the next machine identifier.

According to some embodiments, when a robot arm is mounted on a self-driving vehicle, the robot arm and self-driving vehicle can be used to tend a process even after the location of the process has been moved. For example, a particular machine in a particular location may be tended, and, subsequently, the industrial facility may be reorganized. During the reorganization of the industrial facility, the location of the machine may be changed. In this case, the method proceeds from step 428 to step 430. At step 430, according to some embodiments, the method 400 can be executed by updating the waypoint based on the new process location. Since the vehicle can navigate autonomously based on a waypoint, no other significant changes to facility infrastructure are required.

As shown in FIG. 4, the method 400 may iterate through step 414 from step 430. However, according to some embodiments, the method 400 may return from step 430 to any of step 410 to step 414.

Figure 5:
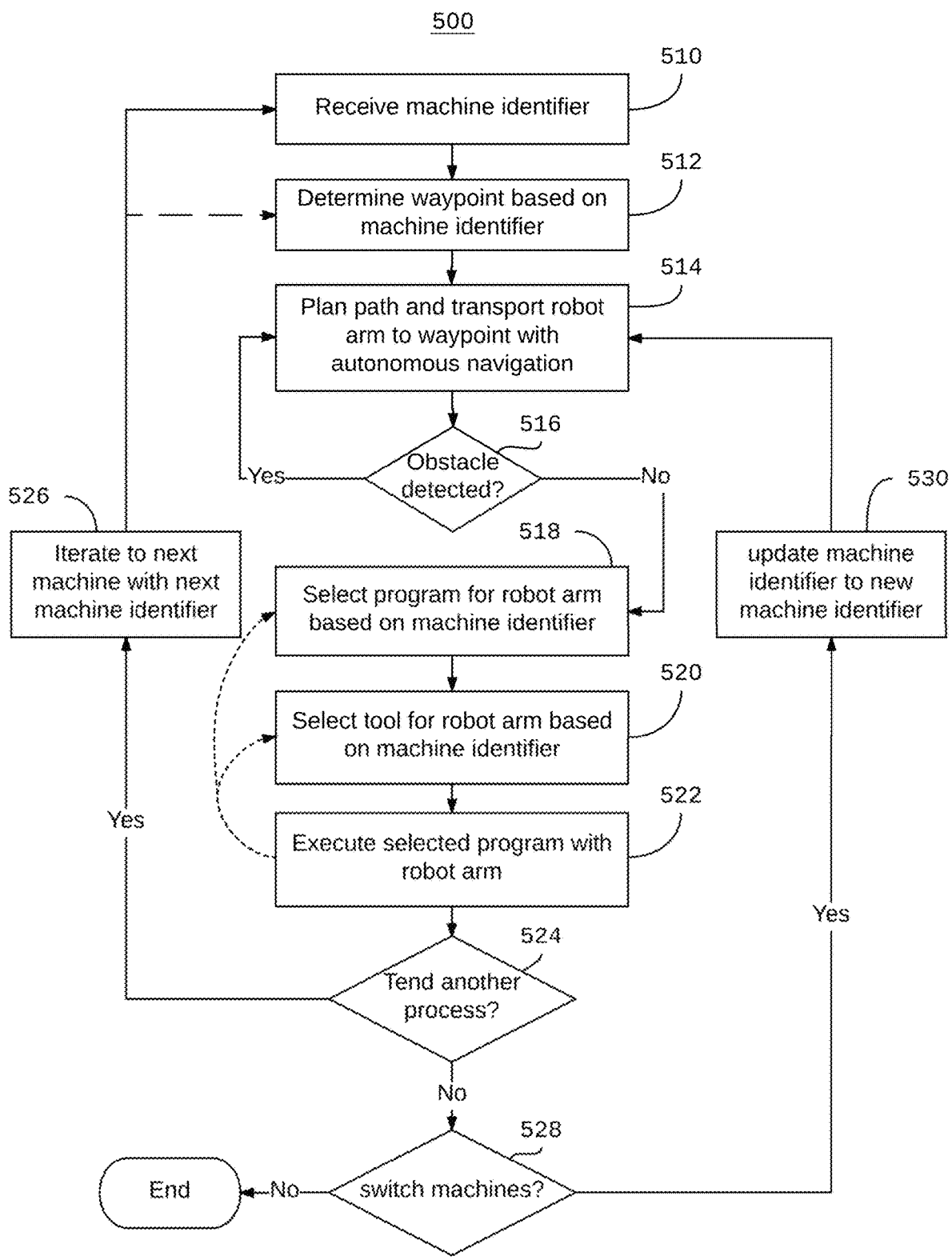
FIG. 5 is a flow diagram depicting a method for machine tending with a robot arm according to some embodiments.

Referring to FIG. 5, there is shown a method 500 of process tending with a robot arm. The method 500 is similar to the method 400 previously described, with one difference being that the method 500 starts with the reception of a machine identifier rather than a waypoint. The method 500 may be implemented using one or more computer processors along with a self-driving vehicle and a robot arm mounted on the self-driving vehicle. Non-transitory computer-readable media may store computer-readable instructions for configuring the one or more processors to execute the steps of the method 500.

The method 500 begins at step 510, when a machine identifier is received. According to some embodiments, the machine identifier may be received from an ERP, an MES, and/or a fleet-management system. In some cases, one or both of an ERP system and an MES may be used. In some cases, the ERP and MES may be part of the same system. Either or both of the ERP and MES may communicate directly with the vehicle or the robot arm.

According to some embodiments, the machine identifier may be received from an ERP and/or MES via the fleet-management system. In some cases, the fleet-management system may be integrated into a single system along with an ERP and/or MES.

The machine identifier may be received by the vehicle directly, or by the vehicle via the robot arm. For example, in some embodiments, an ERP and/or MES may send a schedule of process-tending missions, including one or more machine identifiers, to a fleet-management system. The fleet-management system may then select a particular self-driving vehicle to perform a mission. For example, the fleet-management system may select a vehicle from among a fleet of vehicles, based on the type of robot arm that is mounted on the vehicle, the availability of the vehicle (and mounted robot arm), etc.

At step 512, a waypoint is determined based on the machine identifier received at step 510. According to some embodiments, any or all of the ERP, MES, fleet-management system, vehicle control system, or robot arm control system may store a table or other data that associates a waypoint with a machine identifier. According to some embodiments, any or all of the ERP, MES, fleet-management system, vehicle control system, or robot arm control system may associate a process location with a machine identifier, and then, subsequently, the waypoint may be determined based on the process location.

According to some embodiments, the vehicle's sensors (e.g. vision system) and/or the sensors associated with the robot arm may be able to recognize particular machines and associate them with machine identifiers. For example, the sensors may be used to capture a machine image (e.g. using a vision system), or scan a bar code, QR code, RFID, etc. (e.g. using an appropriate scanner). In some cases, it may be necessary to look up a corresponding machine identifier, for example, by matching a machine image with a machine identifier by querying any or all of the vehicle control system, robot arm control system, fleet-management system, ERP, and MES. In some cases, a machine identifier may be determined directly, for example, if the machine identifier is included in information contained on a bar code, QR code, or RFID tag.

The waypoint determined in step 512 is used in the autonomous navigation of the vehicle. For example, the fleet-management system may send the waypoint to a selected vehicle so that the selected vehicle can autonomously navigate to the waypoint.

In another example, the ERP or MES may be in communication with the robot arm (e.g. using the robot arm's control system). In this case, the robot arm may receive the machine identifier from the ERP or MES, and may then provide the process location or waypoint to the vehicle's control system so that the vehicle can autonomously navigate to the waypoint.

At step 514, the vehicle, using its control system, plans a path to the waypoint. According to some embodiments, the vehicle's control system may use a map of the vehicle's environment (e.g. an industrial facility) stored in the control system to plan a path from the vehicle's current location to the waypoint.

The vehicle transports the robot arm to the waypoint based on the planned path, for example, using the vehicle's drive system and control system. According to some embodiments, as the vehicle is transporting the robot arm, the vehicle's sensors are scanning the vehicle's peripheral environment.

If the vehicle's sensors detect an obstacle on (or in the periphery of) the planned path, then, at step 516, the method returns to step 514, and a new path is planned based on the vehicle's current location, the waypoint, and the detected obstacle. Subsequently, the vehicle continues to transport the robot arm to the waypoint based on the new path that was planned, thereby using autonomous navigation to avoid the obstacle.

If no obstacle is detected, then at step 516, the vehicle continues to transport the robot arm to the waypoint based on the current path. According to some embodiments, the steps 516 and 514 may be executed periodically or continuously throughout the method 500 such that the vehicle is always navigating autonomously in order to avoid collisions with detected obstacles. The particular order of the steps 514 through 520 are shown in FIG. 5 for the purposes of explanation.

At step 518, a program to be executed by the robot arm is selected. One or more programs may be stored in the robot arm control system. For example, a program may be a script or macro set of instructions that are executed by the robot arm. In some cases, the program may be pre-determined, such as by a human programmer, based on the type of machine, the process to be performed by the machine, and/or the orientation of the robot arm relative to the process.

According to some embodiments, any one of an ERP, MES, fleet-management system, robot arm control system, and vehicle control system may store a table or other data that associates the machine identifier with a particular program. In this way, when the machine identifier is known, an associated program can be selected from the one or more programs stored in the robot arm control system.

In some cases, the machine identifier received at step 510 may be a program identifier that directly identifies the program to be selected from the programs stored in the robot arm control system. In other words, it may not be necessary to use a table or other data that associates the machine identifier with a particular program. For example, an ERP and/or MES system may send a program identifier as a part of a mission schedule to the fleet-management system or directly to the robot arm or vehicle.

At step 520, a tool (e.g. end effector) may be selected for use by the robot arm. According to some embodiments, a particular program for execution may be selected at step 518, and, similarly, a particular tool may also be selected. For example, tools may include various types of grippers, spot welders, laser welders, etc. According to some embodiments, the tool may be selected based on the process location, waypoint, or machine identifier (for example, in a similar manner as previously described for the selection of the program), or based on the selected program. According to some embodiments, the vehicle may carry an assortment of tools from which one can be selected, as well as a tool-changing appliance so that the tool on the end of the robot arm can be changed without human intervention.

According to some embodiments, more than one program may be executed at the waypoint and/or a program may be executed using more than one tool. As indicated by the stippled lines in FIG. 5, the method may return to step 518 so that a different program can be subsequently executed after a previous program was executed at step 522. For example, a first program may be used to load a workpiece into a process. A second program may be used to orient the workpiece in the process. A third program may be used to unload the workpiece from the process. In some embodiments, the loading, orientation, and unloading may be performed based on a single program, while in other embodiments, each of the loading, orientation, and unloading may be performed based on a sequence of different programs. In the case that each is performed based on a sequence of different programs, the method may loop through steps 518 and 522 for each program.

Similarly, the method may loop through steps 520 and 522. For example, a first program may be used to load a workpiece with a manipulator tool. A second program may be used to place a weld on the workpiece using a welding tool. A third program may be used to unload the workpiece with a manipulator tool. In this case, the method may loop through step 520 so that the tool can be changed from the manipulator tool to the welding tool and back to the manipulator tool accordingly.

At some point throughout the course of executing steps 514 to 520, the vehicle transports the robot arm to the waypoint. Once the vehicle is at the waypoint, then, at step 522, the selected program is executed on the process, thereby tending the process.

According to some embodiments, when a robot arm is mounted on a self-driving vehicle, the robot arm and self-driving vehicle can be used to tend processes at different locations. For example, as previously described, an ERP and/or MES may send a schedule of process-tending missions including more than machine identifier to a fleet-management system. In another example, a robot arm may be transported to a first process in order to execute a first program, and, subsequently, the vehicle may receive a second machine identifier to which the robot arm is to be transported in order to execute a second program.

If, at step 524, the robot arm and self-driving vehicle are required to tend another process, then the method returns to step 510. When the method 500 is executed on this iteration (subsequent to executing steps 522 and 524), a new machine identifier may be received at step 510, or, in some cases, the new machine identifier may have been received at the same time as the previous machine identifier. In other words, as previously described, multiple machine identifiers can be received as a part of a single schedule, or they may be received on an as-needed or "real-time" basis.

As indicated by the dashed line in FIG. 5, in some cases, iterating through the method 500 in order to have the robot arm and vehicle tend another process may involve determining a new waypoint. For example, if the new machine identifier is already known (for example, previously provided in a schedule), then the decision to tend another process at 524 may be analogous to iterating to the next waypoint.

According to some embodiments, when a robot arm is mounted on a self-driving vehicle, the robot arm and self-driving vehicle can be used to tend a process that has replaced a previous process in the same location. For example, a particular machine in a particular location may be tended, and, subsequently, the machine may be replaced with a different machine through an upgrade or replacement. In this case, the method proceeds from step 528 to step 530. At step 530, according to some embodiments, the method 500 can be executed by updating the machine identifier. According to some embodiments, since the process location is already known, the method can proceed based on a new machine identifier.

As shown in FIG. 5, the method 500 may iterate through step 514 from step 530. However, according to some embodiments, the method 500 may return from step 530 to any of step 510 to step 514.

Figure 6:
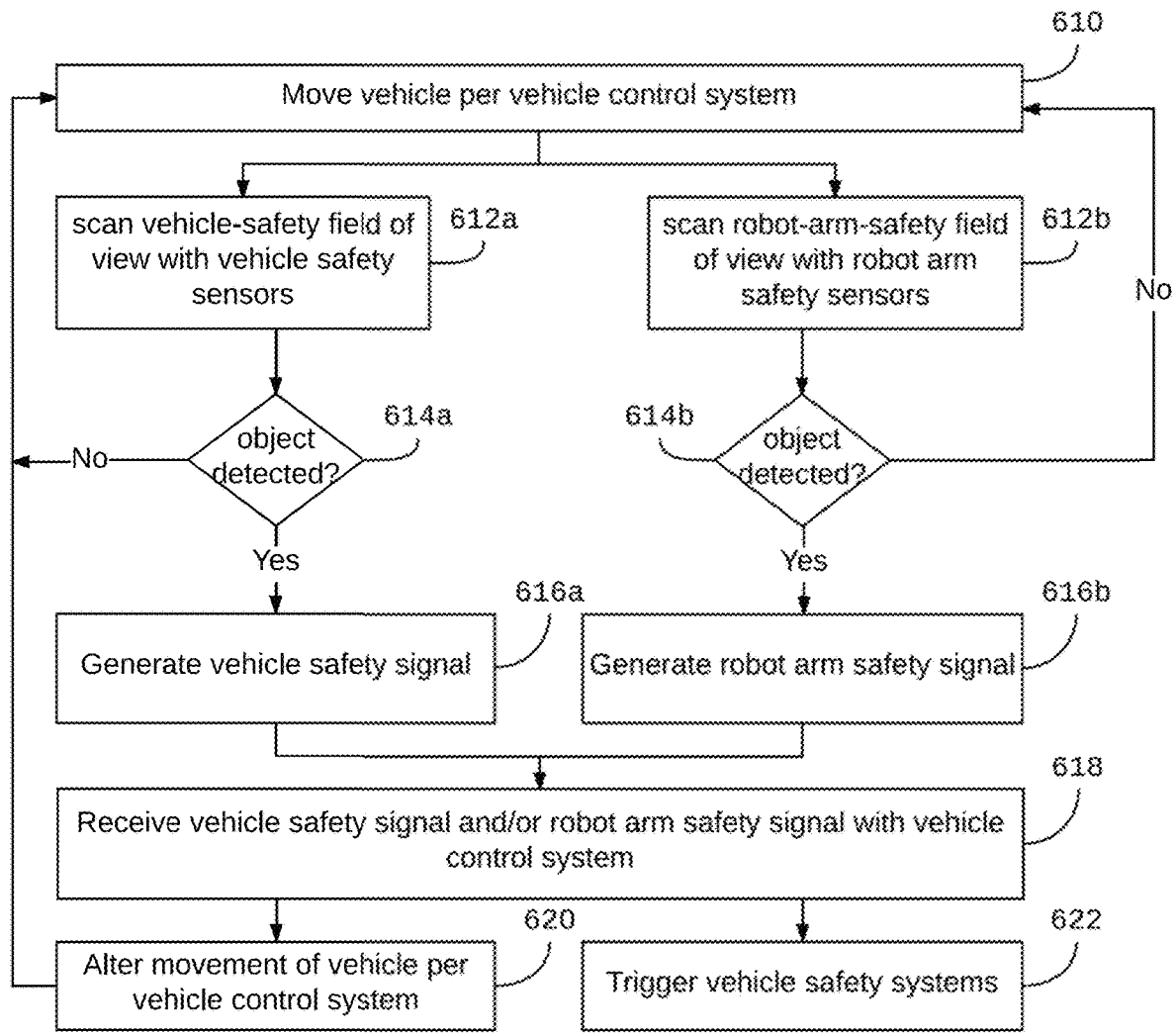
FIG. 6 is a flow diagram depicting a method of operating a self-driving vehicle carrying a robot arm according to some embodiments.

Referring to FIG. 6, there is shown a method of operating a self-driving vehicle carrying a robot arm according to some embodiments. The method 600 may be executed sequentially according to the example depicted in FIG. 6. According to some embodiments, various steps of the method 600 may be executed concurrently, in parallel, or on a continual or periodic basis. For example, the steps labelled with "a" and "b" may be executed concurrently or in parallel according to some embodiments.

The method 600 begins at step 610 when a self-driving vehicle carrying a robot arm moves according to the vehicle control system. According to some embodiments, the vehicle may be moved using autonomous navigation by the vehicle's control system, for example, including path-planning based on a map stored in the vehicle's control system, sensing objects in the vehicle's environment using the vehicle's sensors, and planning new paths based on the sensed objects.

At step 612a, the vehicle-safety field of view is scanned using the vehicle safety sensors. As previously described, the vehicle may be equipped with more than one sensor. According to some embodiments, some sensors may be used for safety purposes, whereas other sensors may be used for localization and mapping. In some embodiments, the same sensor(s) may be used for both safety and localization/mapping.

At step 612b, the robot arm field of view is scanned using the robot arm safety sensors. Generally speaking, and as per the example depicted in FIG. 3, the vehicle-safety field of view is associated with the vehicle safety sensors whereas the robot-arm-safety field of view is associated with the robot arm safety sensors. At least one portion of the vehicle-safety field of view does not overlap the robot-arm-safety field of view.

According to some embodiments, steps 612a and steps 612b are continuously or periodically employed such that the vehicle-safety field of view and the robot-arm-safety field of view are continuously or periodically being scanned for objects that may pose a safety risk (e.g. risk of collision that could cause injury to a human and/or property damage).

At step 614a, if no object has been detected in the vehicle-safety field of view, then the method returns to step 610, and the vehicle continues to move per the vehicle control system. Similarly, at step 614b, if no object has been detected in the robot-arm-safety field of view, then the method returns to step 610.

If, at step 614a, an object is detected in the vehicle-safety field of view, then the method proceeds to step 616a. Similarly, if, at step 614b, an object is detected in the robot-arm-safety field of view, then the method proceeds to step 616b.

At step 616a, a vehicle safety signal is generated. According to some embodiments, the vehicle safety signal may be generated by the vehicle control system. For example, a vehicle safety signal may be generated in order to instruct the vehicle control system to stop the vehicle. According to some embodiments, the vehicle safety signal may instruct the vehicle control system to steer the vehicle away from an object in order to avoid a collision. Generally, the vehicle safety signal is generated in response to an object being detected within the vehicle-safety field of view, so that the vehicle's movement can be altered (e.g. stopped, steered, accelerated, etc.) in response to the vehicle safety signal.

At step 616b, a robot arm safety signal may is generated. According to some embodiments, the robot arm safety signal may be generated by at least one (or both) of the robot arm control system and the vehicle control system. For example, a robot arm safety signal may be generated in order to instruct the vehicle control system to stop the vehicle. According to some embodiments, the robot arm safety signal may instruct the vehicle control system in a similar manner as the vehicle safety signal.

At step 618, the vehicle safety signal and/or the robot arm safety signal are received with the vehicle control system, depending on the outcomes of steps 614a and 614b. As a point of clarification, the safety signals, as described herein, are deemed to be generated and received by the vehicle control system according to some embodiments. This is intended to describe communication of information from the sensors to the vehicle control system, and ultimately to vehicle's drive system. According to some embodiments, the vehicle control system may receive a signal from the sensors, generate a safety signal based on the sensor signal, and then derive instructions for the drive system based on the safety signal. According to some embodiments, a signal from the sensors may be equivalent to a safety signal, such that the control system derives instructions for the drive system based on the sensor signal (i.e. safety signal).

At step 620, the movement of the vehicle may be altered by the vehicle control system based on the safety signals received at step 618. For example, at step 620, the vehicle control system may stop the vehicle (e.g. by braking the vehicle's drive system or decelerating the drive motors) based on the safety signals received.

According to some embodiments, step 622 may also be employed in order to trigger other safety systems of the vehicle, for example, which may not be directly related to moving the vehicle. For example, safety relays or other similar low-level control signals may be activated.

While either or both of the vehicle safety signal and the robot arm safety signal may be received at step 618, the vehicle control system may selectively use either or both of the vehicle safety signal and the robot arm safety signal. According to some embodiments, and as previously described, distinct operating modes may be established and characterized based on which safety signals are used to alter the vehicle's movement. For example, in one mode, the vehicle control system may effectively ignore the robot arm safety signal, since the first mode may be associated with a robot arm position in which the robot arm is contained entirely within the perimeter of the vehicle, and/or the robot arm may be locked so that it doesn't move. In other words, if the robot arm is in a state that is known to not represent a specific risk of collision with an object detected within the robot-arm-safety field of view, then the robot arm safety signal can be seen as a false positive with respect to actual collision avoidance. As such, there may be no need to alter the movement of the vehicle based on objects detected in the robot-arm-safety field of view.

Figure 7:
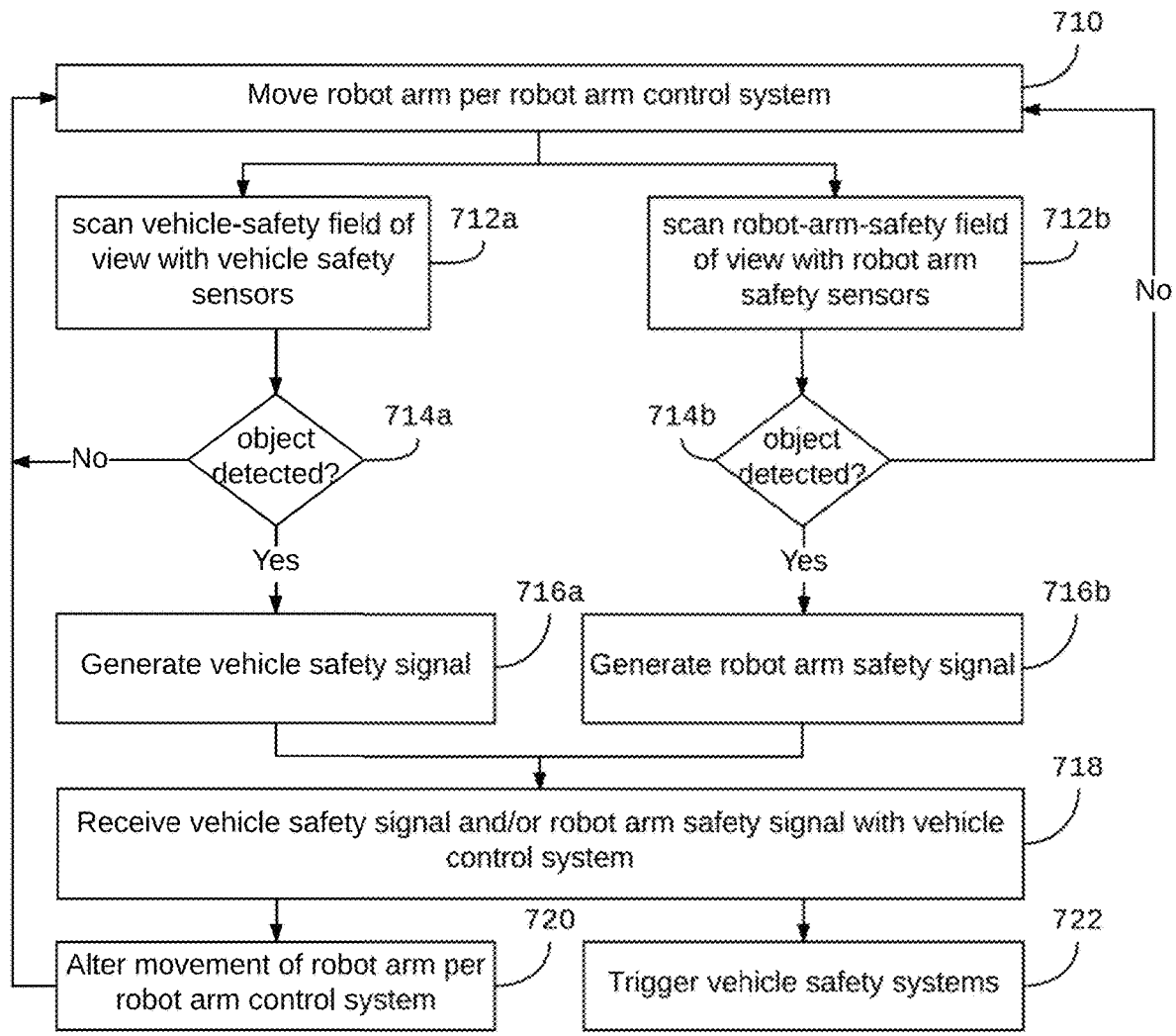
FIG. 7 is a flow diagram depicting a method of operating a robot arm mounted on a self-driving vehicle according to some embodiments.

Referring to FIG. 7, there is shown a method of operating a robot arm mounted on a self-driving vehicle according to some embodiments. Generally, the method 700 may comprise similar steps as the method 600 previously described. One difference between the methods 600 and 700 is that the method 600 pertains to controlling the movement of the vehicle using the vehicle control system whereas the method 700 pertains to controlling the movement of the robot arm using the robot arm control system. With this in mind, similar steps are labelled using similar numerical labels in FIG. 6 and FIG. 7.

The method 700 begins at step 710 when a robot arm mounted on a self-driving vehicle moves according to the robot arm control system. According to some embodiments, the robot arm may be moved according to a program stored in the robot arm control system.

At step 712a, a vehicle-safety field of view is scanned using vehicle safety sensors. As previously described, the vehicle may be equipped with more than one sensor. According to some embodiments, some sensors may be used for safety purposes, whereas other sensors may be used for localization and mapping. In some embodiments, the same sensor(s) may be used for both safety and localization/mapping.

At step 712b, a robot arm field of view is scanned using robot arm safety sensors. Generally speaking, and as per the example depicted in FIG. 3, the vehicle-safety field of view is associated with the vehicle safety sensors whereas the robot-arm-safety field of view is associated with the robot arm safety sensors. At least one portion of the vehicle-safety field of view does not overlap the robot-arm-safety field of view.

According to some embodiments, steps 712a and steps 712b are continuously or periodically employed such that the vehicle-safety field of view and the robot-arm-safety field of view are continuously or periodically being scanned for objects that may pose a safety risk (e.g. risk of collision that could cause injury to a human and/or property damage).

At step 714a, if no object has been detected in the vehicle-safety field of view, then the method returns to step 710, and the robot arm continues to move per the robot arm control system. Similarly, at step 714b, if no object has been detected in the robot-arm-safety field of view, then the method returns to step 710.

If, at step 714a, an object is detected in the vehicle-safety field of view, then the method proceeds to step 716a. Similarly, if, at step 714b, an object is detected in the robot-arm-safety field of view, then the method proceeds to step 716b.

At step 716a, a vehicle safety signal is generated. According to some embodiments, the vehicle safety signal may be generated by the vehicle control system. For example, a vehicle safety signal may be generated in order to instruct the robot arm control system to stop the robot arm. According to some embodiments, the vehicle safety signal may instruct the robot arm control system to move the robot arm away from an object in order to avoid a collision. Generally, the vehicle safety signal is generated in response to an object being detected within the vehicle-safety field of view, so that the robot arm's movement can be altered (e.g. stopped, steered, accelerated, etc.) in response to the vehicle safety signal.

At step 716b, a robot arm safety signal may be generated. According to some embodiments, the robot arm safety signal may be generated by at least one (or both) of the robot arm control system and the vehicle control system. For example, a robot arm safety signal may be generated in order to instruct the robot control system to stop the robot arm. According to some embodiments, the robot arm safety signal may instruct the robot arm control system in a similar manner as the robot arm safety signal.

At step 718, the vehicle safety signal and/or the robot arm safety signal are received with the robot arm control system, depending on the outcomes of steps 714a and 714b. As a point of clarification, the robot arm safety signal, as described herein, may be generated and received by the robot arm control system according to some embodiments. This is intended to describe communication of information from the robot arm safety sensors to the robot arm control system, and ultimately to the robot arm. According to some embodiments, the robot arm control system may receive a signal from the sensors, generate a safety signal based on the sensor signal, and then derive instructions for the robot arm based on the safety signal. According to some embodiments, a signal from the sensors may be equivalent to a safety signal, such that the control system derives instructions for the drive system based on the sensor signal (i.e. safety signal).

At step 720, the movement of the robot arm may be altered by the robot arm control system based on the safety signals received at step 718. For example, at step 720, the robot arm control system may stop the movement of the robot arm based on the safety signals received.

According to some embodiments, step 722 may also be employed in order to trigger other safety systems of the vehicle, for example, which may not be directly related to moving the vehicle. For example, safety relays or other similar low-level control signals may be activated.

While either or both of the vehicle safety signal and the robot arm safety signal may be received at step 718, the robot arm control system may selectively use either or both of the vehicle safety signal and the robot arm safety signal. According to some embodiments, and as previously described, distinct operating modes may be established and characterized based on which safety signals are used to alter the robot arm's movement. For example, in one mode, the robot arm control system may effectively ignore the vehicle safety signal, since the particular mode may be associated with the vehicle being stopped in a particular position while the robot arm is executing a program. In other words, if the vehicle is in a state that is known to not represent a specific risk of collision with an object detected within the vehicle-safety field of view, then the vehicle safety signal can be seen as a false positive with respect to actual collision avoidance. As such, there may be no need to alter the movement of the robot arm based on objects detected in the robot-arm-safety field of view.

As previously described, with respect to both the methods 600 and 700, there may be an operating mode in which both the vehicle safety signal and the robot arm safety signal are used to alter the movement of the vehicle or the robot arm. In other words, objects detected in either field of view may trigger a stoppage of the vehicle and/or the robot arm, thereby integrating both safety systems into the operation of the vehicle and/or the robot arm.

The present invention has been described here by way of example only. Various modification and variations may be made to these exemplary embodiments without departing from the spirit and scope of the invention, which is limited only by the appended claims.

We claim:

1. A system for process tending with a self-driving vehicle having a robot arm, the system comprising:
   a server configured to provide a process location;
   the self-driving vehicle having:
      a vehicle control system storing a map and configured to:
         capture a machine image and determine a machine identifier based on the machine image;
         receive the process location from the server;
         determine a waypoint based on the one or more of the process location and the machine identifier; and
         autonomously navigate the self-driving vehicle to the waypoint based on the map; and
      a vision system operable by the vehicle control system for capturing the machine image;
      at least one vehicle safety sensor in communication with the vehicle control system, for sensing a vehicle obstacle in the environment of the self-driving vehicle, such that the vehicle control system autonomously navigates the self-driving vehicle to the waypoint based at least on the map and the vehicle obstacle; and
   the robot arm mounted on the vehicle, the robot arm having a robot arm control system storing at least one program executable by the robot arm, the robot arm control system being configured to:
      select a target program from the at least one program based on the one or more of the process location and the machine identifier; and
      execute the target program for at least operating the robot arm at the waypoint; and
      the robot arm control system comprises at least one robot arm safety sensor in communication with the robot arm control system, for sensing a robot arm obstacle in the environment of the robot arm, such that the robot arm control system alters a movement of the robot arm based at least on the robot arm obstacle.

2. The system of claim 1, wherein the vehicle control system is further configured to navigate the self-driving vehicle to a second waypoint determined based on one or more of a second process location received from the server and a second machine identifier determined from a second image captured by the self-driving vehicle.

3. The system of claim 2, wherein the robot arm control system is configured to:
   select a second target program from the at least one program based on one or more of the second process location and the second machine identifier; and
   execute the second target program with the robot arm at the second waypoint.

4. The system of claim 1, wherein the vision system comprises a non-visible light sensor for capturing at least a portion of the machine image.

5. The system of claim 1, wherein the vehicle control system is further configured to:
   query at least one of the server and the robot arm control system for the machine identifier based on a machine data determined from the machine image.

6. The system of claim 1, wherein the at least one vehicle safety sensor is configured to detect the vehicle obstacle based on a vehicle-safety field of view and the at least one robot arm safety sensor is configured to detect the robot arm obstacle based on a robot-arm-safety field of view;
   wherein at least one part of the vehicle-safety field of view does not overlap with the robot-arm-safety field of view.

7. The system of claim 1, wherein the robot arm control system is further configured to:
   prior to executing the target program, select a tool based on the process location and attaching the tool to the robot arm.

8. A method for process tending with a self-driving vehicle having a robot arm, the method comprises:
   operating a vehicle control system to:
      capture a machine image and to determine a machine identifier based on the machine image;
      receive the process location from a server;
      determine a waypoint based on the one or more of the process location and the machine identifier;
      autonomously navigate the self-driving vehicle to the waypoint based on the map;
      operate a vision system of the self-driving vehicle for capturing the machine image; and
      operate at least one vehicle safety sensor in communication with the vehicle control system for sensing a vehicle obstacle in the environment of the self-driving vehicle, such that the vehicle control system autonomously navigates the self-driving vehicle to the waypoint based at least on the map and the vehicle obstacle; and
   operating a robot arm control system of the robot arm mounted on the vehicle to:
      select a target program from at least one program stored at the robot arm control system executable by the robot arm based on the one or more of the process location and the machine identifier; and
      execute the target program for at least operating the robot arm at the waypoint; and
      operate at least one robot arm safety sensor in communication with the robot arm control system for sensing a robot arm obstacle in the environment of the robot arm, such that the robot arm control system alters a movement of the robot arm based at least on the robot arm obstacle.

9. The method of claim 8 further comprises operating the vehicle control system to navigate the self-driving vehicle to a second waypoint determined based on one or more of a second process location received from the server and a second machine identifier determined from a second image captured by the self-driving vehicle.

10. The method of claim 9 further comprises operating the robot arm control system to:
    select a second target program from the at least one program based on one or more of the second process location and the second machine identifier; and
    execute the second target program with the robot arm at the second waypoint.

11. The method of claim 8, wherein the vision system comprises a non-visible light sensor for capturing at least a portion of the machine image.

12. The method of claim 8 further comprises operating the vehicle control system to:
   query at least one of the server and the robot arm control system for the machine identifier based on a machine data determined from the machine image.

13. The method of claim 8, wherein the at least one vehicle safety sensor is configured to detect the vehicle obstacle based on a vehicle-safety field of view and the at least one robot arm safety sensor is configured to detect the robot arm obstacle based on a robot-arm-safety field of view;
   wherein at least one part of the vehicle-safety field of view does not overlap with the robot-arm-safety field of view.

14. The method of claim 8 further comprises operating the robot arm control system to:
   prior to executing the target program, select a tool based on the process location and attaching the tool to the robot arm.

\* \* \* \* \*